(12) United States Patent
Yu et al.

(10) Patent No.: US 12,401,582 B2
(45) Date of Patent: Aug. 26, 2025

(54) DELAY RIPPLE DETECTION METHOD AND DELAY RIPPLE DETECTION CIRCUIT

(71) Applicant: SANECHIPS TECHNOLOGY CO., LTD., Guangdong (CN)

(72) Inventors: Hejie Yu, Guangdong (CN); Xiaotao Lin, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 23 days.

(21) Appl. No.: 18/692,818

(22) PCT Filed: Sep. 9, 2022

(86) PCT No.: PCT/CN2022/118058
§ 371 (c)(1),
(2) Date: Mar. 17, 2024

(87) PCT Pub. No.: WO2023/040763
PCT Pub. Date: Mar. 23, 2023

(65) Prior Publication Data
US 2024/0430187 A1    Dec. 26, 2024

(30) Foreign Application Priority Data
Sep. 17, 2021    (CN) .......................... 202111097161.3

(51) Int. Cl.
*H04L 67/10*    (2022.01)
*H04L 43/0852*    (2022.01)

(52) U.S. Cl.
CPC .............................. *H04L 43/0852* (2013.01)

(58) Field of Classification Search
CPC . H04L 67/10; H04L 67/60; H04L 9/50; H04L 67/12; H04L 69/329;
(Continued)

(56) References Cited

U.S. PATENT DOCUMENTS 5,442,658 A * 8/1995 Cuny .................... H04L 7/0045
                                                      375/362
2011/0291727 A1* 12/2011 Kim ..................... H03K 5/1534
                                                      327/237

(Continued)

FOREIGN PATENT DOCUMENTS

CN      101552642 A    10/2009
CN      101883426 A    11/2010
(Continued)

OTHER PUBLICATIONS

WIPO, International Search Report issued on Nov. 16, 2022.

*Primary Examiner* — Eva Y Puente
(74) *Attorney, Agent, or Firm* — Li & Cai Intellectual Property (USA) Office

(57) ABSTRACT

The present disclosure provides a delay ripple detection method and a delay ripple detection circuit. The method includes: generating a pulse signal corresponding to a transmission link to be monitored; aligning and transmitting the pulse signal corresponding to the transmission link and data corresponding to the transmission link in the transmission link; and monitoring the pulse signal after being transmitted in the transmission link, and determining whether a delay ripple anomaly is present in the transmission link according to the monitored pulse signal.

20 Claims, 5 Drawing Sheets

(58) Field of Classification Search
CPC . H04L 67/1097; H04L 67/125; H04L 9/3239; H04L 63/1416; H04L 63/20; H04L 67/306; H04L 43/04; H04L 51/04; H04L 51/18; H03K 5/135; H03K 17/941; H03K 17/133; H03K 5/133; H03K 7/08; H03K 2217/94108; H03K 5/19; H03K 7/04; H03K 7/06; G06F 13/24; G06F 1/04; G06F 13/4291; G06F 1/08; G06F 11/0757; G06F 1/3203; G06F 13/4282; G06F 1/12; G06F 1/1632

See application file for complete search history.

(56) References Cited

U.S. PATENT DOCUMENTS

| | | | |
|---|---|---|---|
| 2015/0009834 A1* | 1/2015 | Srikantiah | H04W 56/0015 370/242 |
| 2022/0399045 A1* | 12/2022 | Kim | G11C 7/1039 |
| 2024/0036090 A1* | 2/2024 | Liu | G01R 23/10 |

FOREIGN PATENT DOCUMENTS

| | | |
|---|---|---|
| CN | 113114378 A | 7/2021 |
| JP | 2009049490 A | 3/2009 |

\* cited by examiner

DELAY RIPPLE DETECTION METHOD AND DELAY RIPPLE DETECTION CIRCUIT

CROSS REFERENCE TO RELATED APPLICATIONS

The present disclosure claims the priority to Chinese Patent Application No. 202111097161.3 filed with the China National Intellectual Property Administration on Sep. 17, 2021, the contents of which are incorporated herein by reference in their entirety.

TECHNICAL FIELD

The present disclosure relates to, but is not limited to, the technical field of communications.

BACKGROUND

With the development of the 5$^{th}$ Generation Mobile Communication Technology (5G), the application of technologies such as the Massive Multiple Input Multiple Output (Massive MIMO) antenna technology has met the demand for an increase in system capacity, but also makes requirements of a radio frequency transceiver system on accuracy of a delay of a digital link higher and higher for dealing with a differentiation problem between different channels.

SUMMARY

The present disclosure provides a delay ripple detection method and a delay ripple detection circuit.

In a first aspect, the present disclosure provides a delay ripple detection method, including: generating a pulse signal corresponding to a transmission link to be monitored; aligning and transmitting the pulse signal corresponding to the transmission link and data corresponding to the transmission link to in the transmission link; and monitoring the pulse signal after being transmitted in the transmission link, and determining whether a delay ripple anomaly is present in the transmission link according to the monitored pulse signal.

In a second aspect, the present disclosure provides a delay ripple detection circuit, including: a pulse generation circuit configured to generate a pulse signal corresponding to a transmission link to be monitored; a transmission link configured for alignment and transmission of the pulse signal corresponding to the transmission link and data corresponding to the transmission link in the transmission link; and a pulse monitoring circuit configured to monitor the pulse signal after being transmitted in the transmission link, and determine whether a delay ripple anomaly is present in the transmission link according to the monitored pulse signal.

DETAIL DESCRIPTION OF EMBODIMENTS

Figure 1:
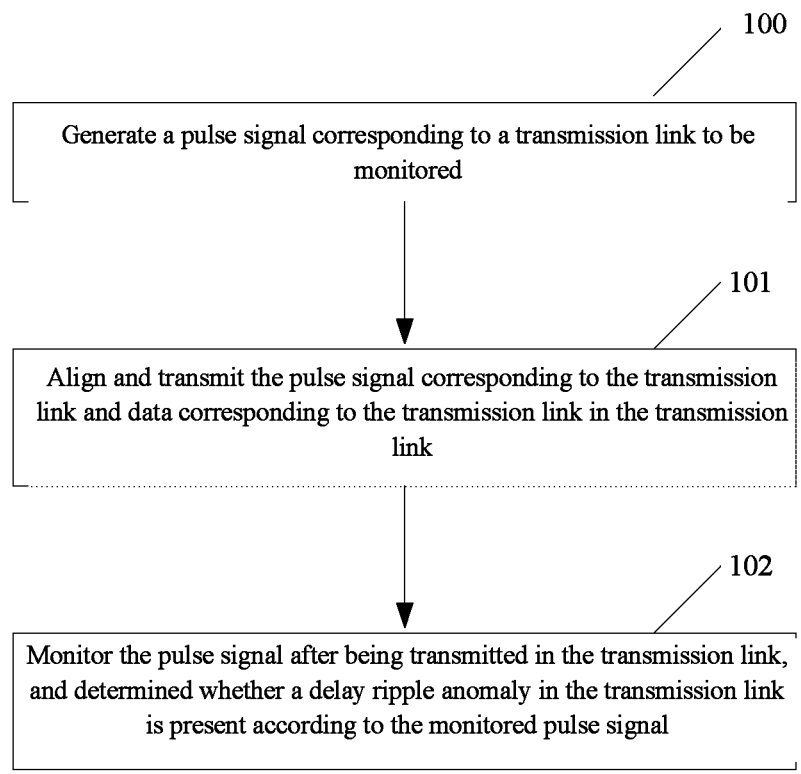
FIG. 1 is a flowchart illustrating a delay ripple detection method according to the present disclosure.

In order to enable those of ordinary skill in the art to better understand the technical solutions of the present disclosure, a delay ripple detection method and a delay ripple detection circuit provided by the present disclosure are described in detail below with reference to the drawings.

Exemplary implementations will be described more fully below with reference to the drawings, but the exemplary implementations may be embodied in different forms, and should not be interpreted as being limited to the implementations described herein. Rather, the exemplary implementations are provided to make the present disclosure thorough and complete, and are intended to enable those of ordinary skill in the art to fully understand the scope of the present disclosure.

The implementations of the present disclosure and the features therein may be combined with each other if no conflict is incurred.

The term "and/or" used herein includes any combination and all combinations of at least one associated listed item.

The terms used herein are merely used to describe specific implementations, and are not intended to limit the present disclosure. As used herein, "a" and "the" which indicate a singular form are intended to include a plural form, unless expressly stated in the context. It should be further understood that the term(s) "comprise" and/or "be made of" used herein indicate(s) the presence of features, integers, operations, elements and/or components, but do not exclude the presence or addition of at least one other feature, integer, operation, element, component and/or combinations thereof.

All terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

With the development of 5G, the application of the technologies such as the Massive MIMO antenna technology has met the demand for an increase in the system capacity, but also makes requirements of a radio frequency transceiver system on accuracy of a delay of a digital link higher and higher for dealing with a differentiation problem between different channels. For data on a multi-link channel, at an upstream/downstream Digital Pre-Distortion (DPD)

position or antenna, the received data are combined and then transmitted to a next stage for processing; and before the received data are combined, a combination mode needs to be adjusted according to a delay of a link when being powered on, so as to ensure synchronous correspondence of data output after the data input to upstream and downstream links at the same time are processed. If the delay of the link does not fluctuate or fluctuates slightly, the combination mode may be kept unchanged; and if the delay of the link fluctuates greatly, the combination mode needs to be adjusted or the delay of the link needs to be corrected. A clock of a digital link may fluctuate due to changes of integrated circuit process characteristics such as Process, Voltage, and Temperature (PVT). For transmission of data streams in a same clock domain, the fluctuation of the clock merely affects accuracy of single data at a current moment, without affecting subsequent data. For transmission of data streams across clock domains, the fluctuation of the clock may change a delay of data passing through a First Input First Output (FIFO) queue, which may cause a change of a delay of the whole link, and the change of the delay is kept in the whole link. The accumulation of the change of the delay may exceed the accuracy requirements of the radio frequency transceiver system. Therefore, delay ripple detection of the digital link is needed.

In the existing technology, a delay ripple detection method is to perform selective sampling on data in each clock domain of the digital link, analyze and calculate a transmission delay between the data by data-related algorithms, compare the transmission delay with a standard value to determine whether a delay ripple is present and determine a region where the delay ripple is present, and then perform correction and adjustment. This method has no dynamic sensitivity to the delay ripple detection of link, and merely performs offline analysis after the sampling, and the analysis takes long time and has a significant lag.

FIG. 1 is a flowchart illustrating a delay ripple detection method according to the present disclosure.

In a first aspect, referring to FIG. 1, the present disclosure provides a delay ripple detection method, which can be flexibly applied to different working modes and scenarios. In an implementation, the delay ripple detection method may include operation 100 and operation 102.

In operation 100, a pulse signal corresponding to a transmission link to be monitored is generated.

In the implementations of the present disclosure, the number of transmission links to be monitored may be one, or may be two or more. In the case where the number of transmission links to be monitored is two or more, pulse signals corresponding to the respective transmission links need to be generated respectively, and the pulse signals corresponding to the different transmission links may be the same or different, depending on the specific transmission links.

In some exemplary implementations, the transmission link includes at least one of: a sending link, a receiving link, a feedback link, the sending link and the receiving link, or the sending link and the feedback link.

Figure 2:
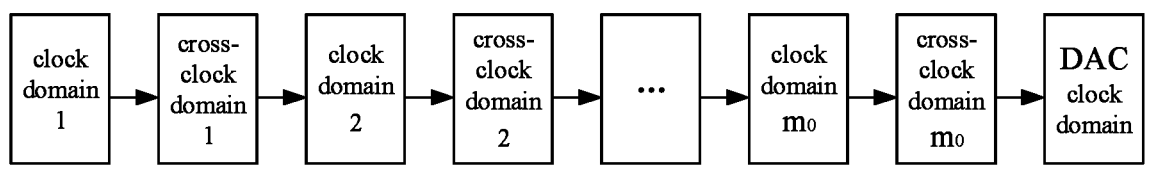
FIG. 2 is a schematic diagram illustrating circuit connection of a sending link according to the present disclosure.
Figure 3:
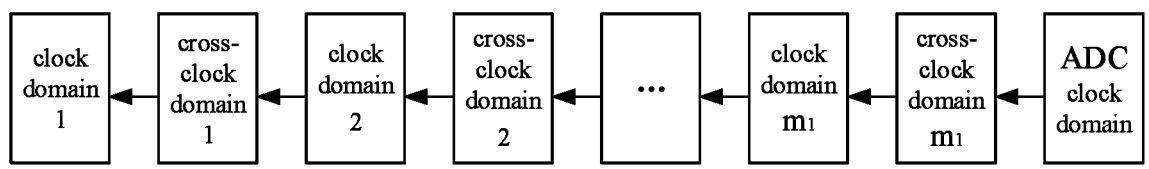
FIG. 3 is a schematic diagram illustrating circuit connection of a receiving link according to the present disclosure.
Figure 4:
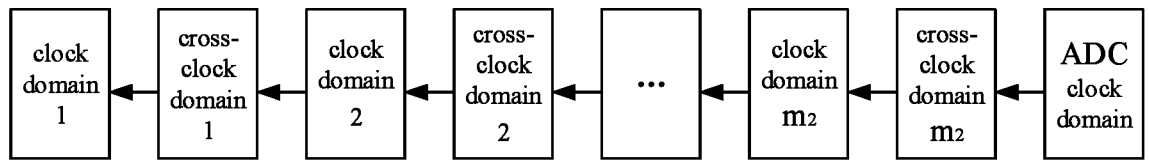
FIG. 4 is a schematic diagram illustrating circuit connection of a feedback link according to the present disclosure.

In the implementations of the present disclosure, each transmission link may include two or more clock domains, and the different clock domains are connected through a cross-clock domain. Each clock domain refers to a circuit adopting a same clock, and each cross-clock domain refers to a circuit for performing clock domain conversion. For example, as shown in FIG. 2, a sending link includes $m_0+1$ clock domains and $m_0$ cross-clock domains, the $m_0+1$ clock domains are: a clock domain 1, a clock domain 2, ..., a clock domain $m_0$, and a Digital Analog Converter (DAC) clock domain respectively, and the $m_0$ cross-clock domains are: a cross-clock domain 1, a cross-clock domain 2, ..., and a cross-clock domain $m_0$ respectively; and when data is transmitted in the sending link, the data is transmitted in an order of the clock domain 1, the cross-clock domain 1, the clock domain 2, the cross-clock domain 2, ..., the clock domain $m_0$, the cross-clock domain $m_0$, and the DAC clock domain. As shown in FIG. 3, a receiving link includes $m_1+1$ clock domains and $m_1$ cross-clock domains, the $m_1+1$ clock domains are: a clock domain 1, a clock domain 2, ..., a clock domain $m_1$, and an Analog Digital Converter (ADC) clock domain respectively, and the $m_1$ cross-clock domains are: a cross-clock domain 1, a cross-clock domain 2, ..., and a cross-clock domain $m_1$ respectively; and when the data is transmitted in the receiving link, the data is transmitted in an order of the ADC clock domain, the cross-clock domain $m_1$, the clock domain $m_1$, ... the cross-clock domain 2, the clock domain 2, the cross-clock domain 1, and the clock domain 1. As shown in FIG. 4, a feedback link includes $m_2+1$ clock domains and $m_2$ cross-clock domains, the $m_2+1$ clock domains are: a clock domain 1, a clock domain 2 ..., a clock domain $m_2$, and an ADC clock domain respectively, and the $m_2$ cross-clock domains are: a cross-clock domain 1, a cross-clock domain 2 ..., and a cross-clock domain $m_2$ respectively; and when the data is transmitted in the feedback link, the data is transmitted in an order of the ADC clock domain, the cross-clock domain $m_2$, the clock domain $m_2$, ... the cross-clock domain 2, the clock domain 2, the cross-clock domain 1, and the clock domain 1.

Figure 5:
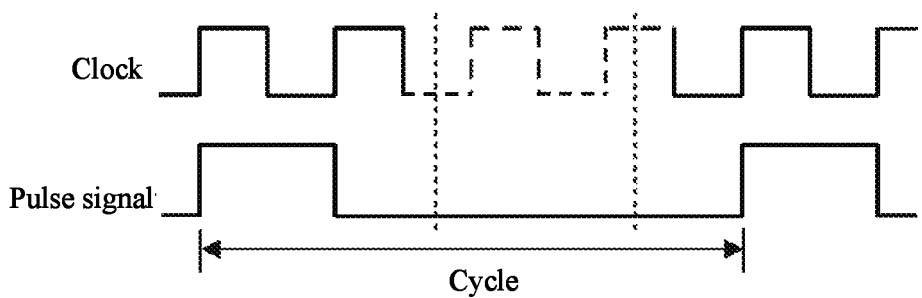
FIG. 5 is a schematic diagram of a pulse signal according to the present disclosure.

In some exemplary implementations, in view of the fact that the transmission link includes two or more clock domains and different clocks are adopted in the different clock domains, that is, clock frequencies or clock cycles are different in the different clock domains, in order to enable the generated pulse signal to adapt to the clocks of the different clock domains when being transmitted in the transmission link, a proportional relationship between ratios corresponding to all the clock domains in the transmission link is equal to a proportional relationship between the clock frequencies of all the clock domains: a ratio corresponding to a clock domain is a ratio of a cycle of the pulse signal corresponding to the transmission link to a clock cycle of the clock domain. In this way, the cycle of the pulse signal corresponding to the transmission link remains unchanged in the different clock domains of the same transmission link, and for the pulse signal corresponding to the transmission link, a high level signal of one clock cycle exists in each clock domain, as shown in FIG. 5. By adopting the pulse signal with the fixed cycle, analysis of diversity of decimation and interpolation of multi-bit data when being transmitted in the transmission link can be avoided, and delay ripple detection can be performed conveniently and quickly by taking use of form invariance of the pulse signal during a transmission process thereof.

For example, assuming that a certain transmission link includes two clock domains, namely a clock domain 1 and a clock domain 2, a clock frequency of the clock domain 1 is 983.04 megahertz (MHz), a clock frequency of the clock domain 2 is 737.28 MHZ, and a proportional relationship between the clock frequency of the clock domain 1 and the clock frequency of the clock domain 2 is 4:3, then a ratio of a cycle of a pulse signal corresponding to the transmission link to a clock cycle of the clock domain 1 and a ratio of the cycle of the pulse signal corresponding to the transmission link to a clock cycle of the clock domain 2 should also have a proportional relationship of 4:3.

In the implementations of the present disclosure, the form invariance of the pulse signal refers to that the cycle of the pulse signal is the same in the different clock domains. However, the ratios of the cycle of the pulse signal to the clock cycles of the clock domains are different, and for the pulse signal, a high level signal of merely one clock cycle exists in each clock domain.

In operation 101, the pulse signal corresponding to the transmission link and data corresponding to the transmission link are aligned and transmitted in the transmission link.

In the implementations of the present disclosure, the alignment and transmission of the pulse signal and the data refers to that the pulse signal and the data are transmitted to a lower level circuit synchronously under the control of a data effective enable signal. Illustratively, there are two cases: synchronous transmission in a certain clock domain and synchronous transmission across clock domains. The pulse signal and the data need to meet the following two standards for the aligned transmission: 1. a transmission delay of the pulse signal is the same as that of the data; and 2. the pulse signal and effective data have a fixed corresponding relationship.

In a certain clock domain, without being processed such as being filtered together with the data, the pulse signal is merely subjected to register tapping with a configurable order, so as to ensure that a delay of the pulse signal when being output to a next stage is the same as a delay of the processed data when being output to the next stage in different working scenes. Moreover, although the data is processed differently, such as being subjected to different interpolation processes and different decimation processes, with a filter in the transmission link in different working scenes, a processing mode of the data in a certain working scene is fixed. Therefore, in order to ensure the fixed corresponding relationship between the pulse signal and the effective data, a high level width of the pulse signal is expanded by a configurable multiple according to the multiple relationships of the interpolation processes or the extraction processes of the data (for example, when the data is subjected to an N-fold decimation process, the high level width of the pulse signal is expanded to N times the original high level width; and when the data is subjected to an N-fold interpolation process, the high level width of the pulse signal is reduced to 1/N the original high level width), so that, after the pulse signal is subjected to register tapping under the control of the data effective enable signal, a high-level pulse signal of merely one clock cycle may be obtained when the pulse signal is sampled in a lower level circuit. When being transmitted across the clock domains, the pulse signal and the data signal are combined together, and writing and reading of the signals are controlled by data effective enable signals in a front-stage clock domain and a back-stage clock domain, so as to ensure that the pulse signal and the data signal have the same delay and the fixed effective corresponding relationship.

In operation 102, the pulse signal after being transmitted in the transmission link is monitored, and whether a delay ripple anomaly is present in the transmission link is determined according to the monitored pulse signal.

In some exemplary implementations, determining whether the delay ripple anomaly is present in the transmission link according to the monitored pulse signal includes at least one of the following operations: determining that the delay ripple anomaly is present in the transmission link in the case where a first ratio is not equal to a second ratio, with the first ratio being a ratio of a cycle of the monitored pulse signal to a clock cycle of a last clock domain of the transmission link, and the second ratio being a ratio of the cycle of the pulse signal corresponding to the transmission link to the clock cycle of the last clock domain of the transmission link; or determining that the delay ripple anomaly is not present in the transmission link in the case where the first ratio is equal to the second ratio.

In some exemplary implementations, in the case where the presence of the delay ripple anomaly in the transmission link is determined according to the monitored pulse signal, the method further includes: generating a delay ripple alarm message corresponding to the transmission link, and sampling the pulse signal in at least one clock domain of the transmission link according to the delay ripple alarm message corresponding to the transmission link; and determining a position of the delay ripple anomaly according to the sampled pulse signal, and correcting a delay at the position of the delay ripple anomaly.

In some exemplary implementations, the delay ripple alarm message includes: information representing the presence of the delay ripple anomaly in the transmission link.

In some exemplary implementations, the delay ripple alarm message further includes at least one of: the number of occurrences of delay ripple anomalies, or a difference between the first ratio and the second ratio when a latest delay ripple anomaly is present; and the first ratio is the ratio of the cycle of the monitored pulse signal to the clock cycle of the last clock domain of the transmission link, and the second ratio is the ratio of the cycle of the pulse signal corresponding to the transmission link to the clock cycle of the last clock domain of the transmission link.

In the implementations of the present disclosure, in the case where the number of transmission links is two or more, each transmission link is corresponding to one delay ripple alarm message.

In some exemplary implementations, determining the position of the delay ripple anomaly according to the sampled pulse signal includes: in the case where a third ratio is not equal to a fourth ratio, determining that the position of the delay ripple anomaly is between a clock domain where a certain sampling point in the transmission link is located and a clock domain where a previous sampling point in the transmission link is located; and the third ratio is a ratio of a cycle of the pulse signal sampled at the certain sampling point to a clock cycle of the clock domain where the certain sampling point is located, and the fourth ratio is a ratio of the cycle of the pulse signal corresponding to the transmission link to the clock cycle of the clock domain where the certain sampling point is located.

According to the delay ripple detection method provided in the implementations of the present disclosure, the pulse signal corresponding to the transmission link and the data corresponding to the transmission link are aligned and transmitted in the transmission link, and the pulse signal after being transmitted is monitored, so as to determine whether the delay ripple anomaly is present in the transmission link. Based on the aligned transmission of the pulse signal and the data and the form invariance of the pulse signal in the transmission process thereof, by taking use of a characteristic that a delay ripple may affect the inter-pulse interval between clock domains, real-time detection of the delay ripple of the link is achieved without off-line analysis, and moreover, no complex algorithm or calculation needs to be introduced in, and the detection of the delay ripple of the link can be realized easily and quickly.

Figure 6:
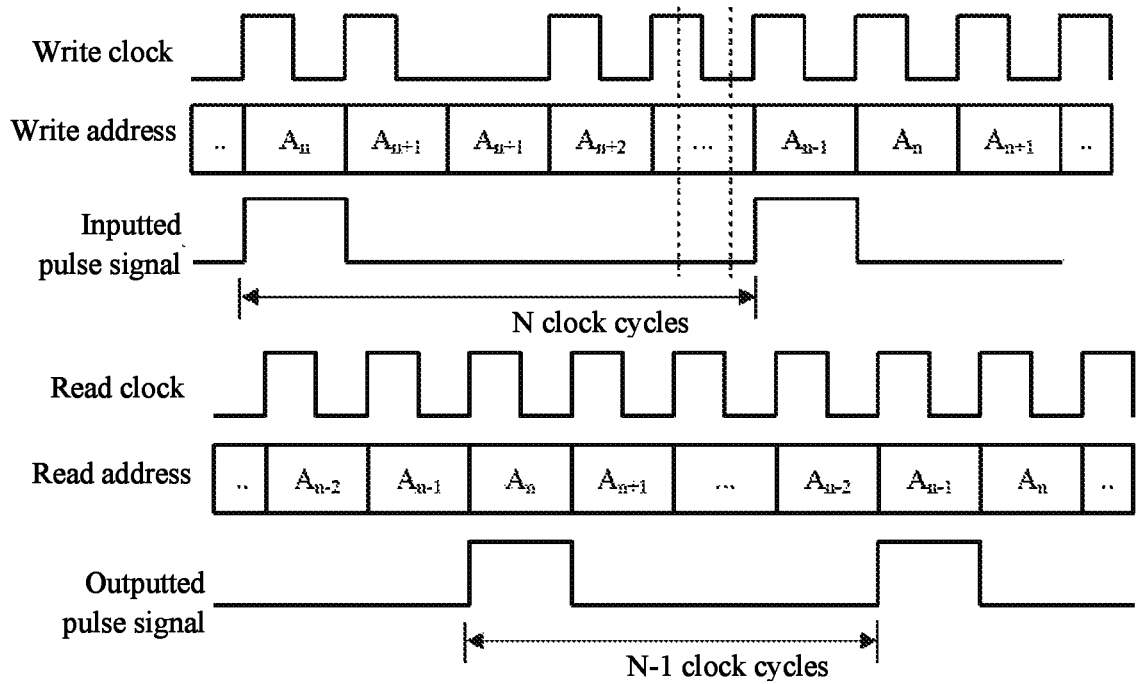
FIG. 6 is a schematic diagram illustrating a delay ripple of a pulse signal across clock domains in a transmission link according to the present disclosure.
Figure 7:
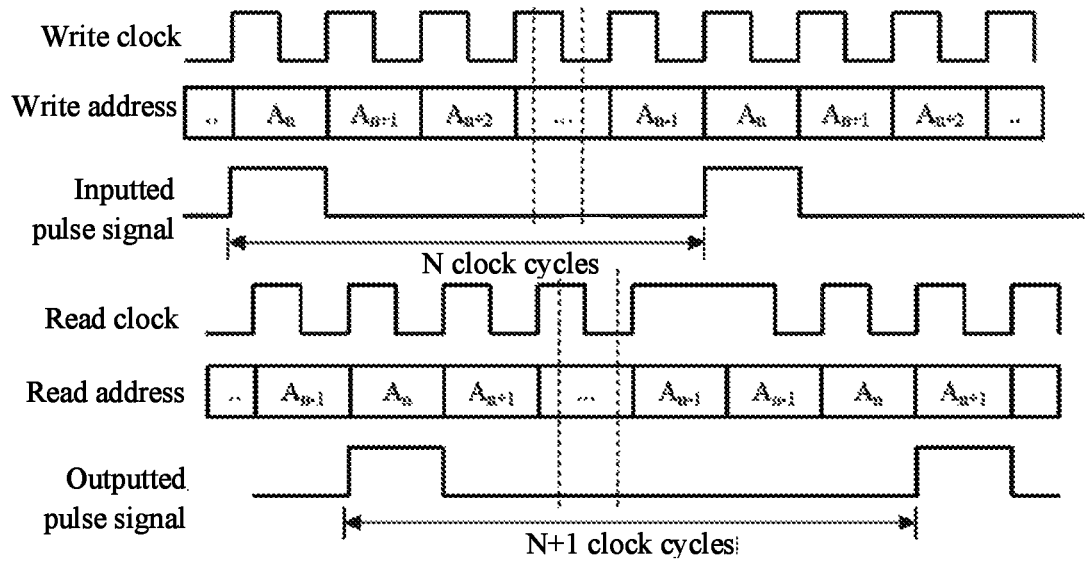
FIG. 7 is another schematic diagram illustrating a delay ripple of a pulse signal across clock domains in a transmission link according to the present disclosure.

An analysis of a reason why the delay ripple may affect the inter-pulse interval between the clock domains is provided below. Since the transmission across the clock domains is implemented by an FIFO memory, when a delay ripple of a read clock or a write clock exceeds one clock cycle, a read address or a write address may continue to keep one clock cycle, and output data may lose one piece of data or repeat one piece of data, which leads to a result that a cycle of a pulse signal output by the FIFO memory is increased or reduced by one clock cycle; and when the read clock and the write clock fluctuate simultaneously (which happens with extremely low probability), an increase and a reduction of a delay across the clock domains may be counteracted, and finally the delay is kept unchanged. As shown in FIG. 6 and FIG. 7, two cases of the delay ripple of the pulse signal across the clock domains of the transmission link are illustrated. As shown in FIG. 6, the write clock loses one clock cycle, the read clock is normal, and the write address continues to keep one clock cycle, so the cycle of the output pulse signal is reduced by one clock cycle. As shown in FIG. 7, the write clock is normal, the read clock is increased by one clock cycle, and the read address continues to keep one clock cycle, so the cycle of the output pulse signal is increases by one clock cycle.

Figure 8:
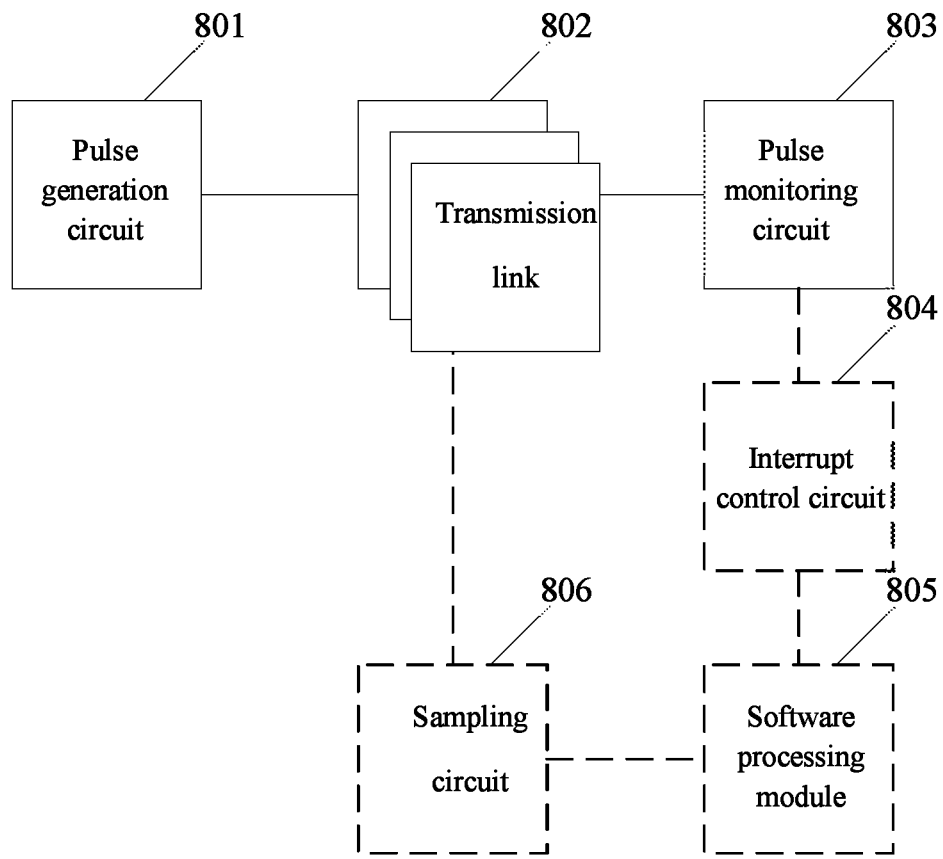
FIG. 8 is a block diagram of a delay ripple detection circuit according to the present disclosure.

FIG. 8 is a block diagram of a delay ripple detection circuit according to the present disclosure.

In a second aspect, referring to FIG. 8, the present disclosure provides a delay ripple detection circuit, which may include: a pulse generation circuit 801 configured to generate a pulse signal corresponding to a transmission link to be monitored; a transmission link 802 configured to align and transmit the pulse signal corresponding to the transmission link and data corresponding to the transmission link in the transmission link; and a pulse monitoring circuit 803 configured to monitor the pulse signal after being transmitted in the transmission link, and determine whether a delay ripple anomaly is present in the transmission link according to the monitored pulse signal.

In the implementations of the present disclosure, the number of transmission links to be monitored may be one, or may be two or more. In the case where the number of transmission links to be monitored is two or more, the pulse generation circuit 801 needs to respectively generate pulse signals corresponding to the respective transmission links, and the pulse signals corresponding to the different transmission links may be the same or different, depending on the specific transmission links.

In some exemplary implementations, the transmission link 802 includes at least one of: a sending link, a receiving link, a feedback link, the sending link and the receiving link, or the sending link and the feedback link.

Figure 9:
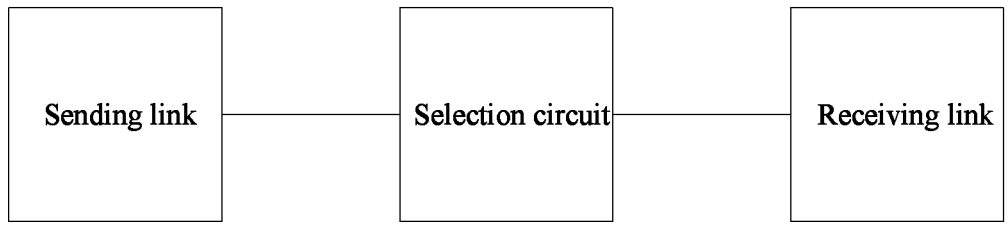
FIG. 9 is a schematic diagram illustrating a connection of a transmission link according to the present disclosure.
Figure 10:
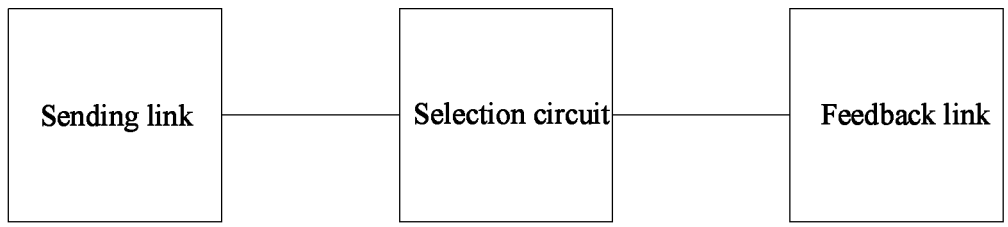
FIG. 10 is another schematic diagram illustrating a connection of a transmission link according to the present disclosure.

In some exemplary implementations, as shown in FIG. 9 and FIG. 10, in the case where the transmission link 802 includes the sending link and the receiving link or the transmission link 802 includes the sending link and the feedback link, the transmission link 802 further includes: a selection circuit configured to connect the sending link to the receiving link or connect the sending link to the feedback link.

Figure 11:
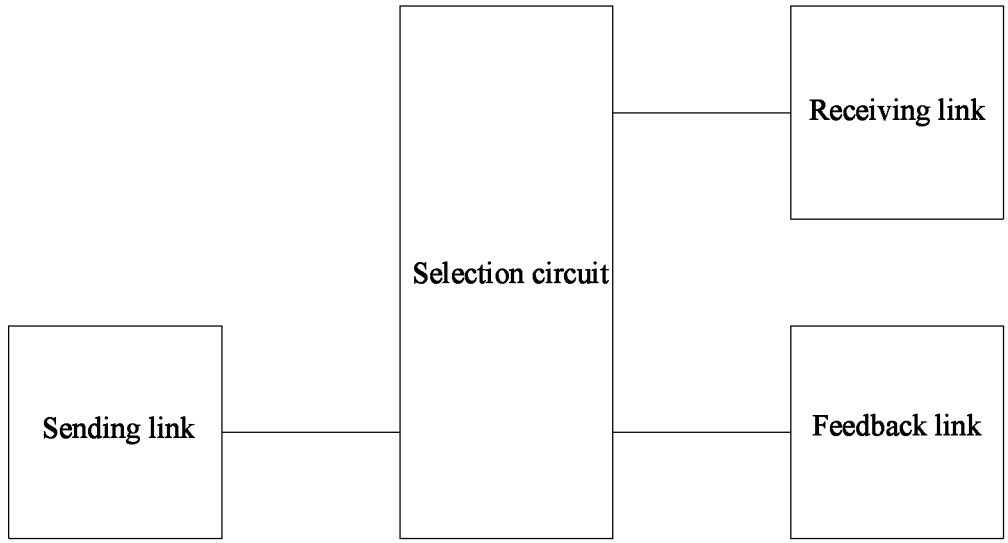
FIG. 11 is yet another schematic diagram illustrating a connection of a transmission link according to the present disclosure.

In some exemplary implementations, the selection circuit may adopt a connection way illustrated by FIG. 11 to be configured to connect the sending link to both the receiving link and the feedback link.

Figure 12:
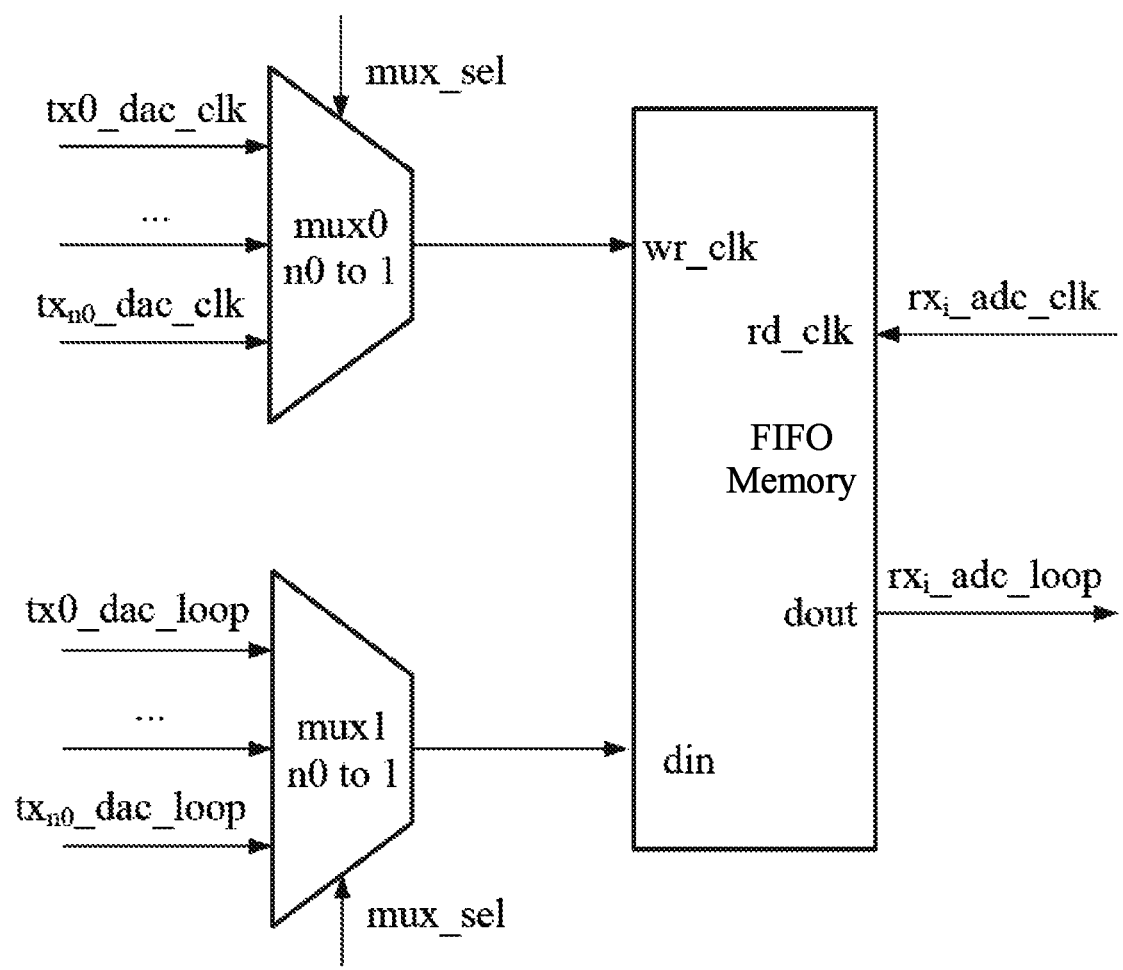
FIG. 12 is a schematic diagram of a basic circuit structure of a selection circuit according to the present disclosure.

In some exemplary implementations, in the case where the number of transmission links 802 to be monitored is merely one and the transmission link 802 includes the sending link and the receiving link or the transmission link 802 includes the sending link and the feedback link, the selection circuit is implemented by a cross-clock domain, that is, by an FIFO memory; and in the case where the number of transmission links 802 to be monitored is two or more and at least one of the transmission links 802 includes the sending link and the receiving link or at least one of the transmission links 802 includes the sending link and the feedback link, the selection circuit may be implemented by a basic circuit structure shown in FIG. 12, and as shown in FIG. 12, the basic circuit structure of the selection circuit includes: a first data selector mux0, a second data selector mux1, and an FIFO memory.

The first data selector mux0 is configured to select, from clocks tx0_dac_clk, . . . , $tx_{n_0}$_dac_clk output by no sending links, the clock output by one sending link according to a select signal mux_sel as a write clock wr_clk of the FIFO memory: the second data selector mux1 is configured to select, from pulse signals tx0_dac_loop, . . . , $tx_{n_0}$_dac_loop output by the no sending links, the pulse signal output by a sending link, which is the sending link selected by the first data selector mux0, according to a select signal mux_sel and take the selected pulse signal as a write signal din to the FIFO memory; and the FIFO memory is configured to output, according to the clock of the selected sending link and a clock $rx_i$_adc_clk (the clock serves as a read clock rd_clk of the FIFO memory) input by the connected receiving link or feedback link, the pulse signal, which is output by the selected sending link, in an FIFO manner as an output signal dout of the FIFO memory to the connected receiving link or feedback link as a clock $rx_i$_adc_loop input to the connected receiving link or feedback link.

The basic circuit structure shown in FIG. 12 may select one sending link from the no sending links to be connected to one receiving link or one feedback link, thus forming one loopback link. If the number of transmission links to be monitored is two or more, the basic circuit structure shown in FIG. 12 may be duplicated to realize connection of a plurality of sending links with a plurality of receiving links or a plurality of feedback links, thus forming a plurality of loopback links.

In the implementations of the present disclosure, each transmission link may include two or more clock domains, and the different clock domains are connected through a cross-clock domain. Each clock domain refers to a circuit adopting a same clock, and each cross-clock domain refers to a circuit for performing clock domain conversion. For example, as shown in FIG. 2, the sending link includes $m_0+1$ clock domains and $m_0$ cross-clock domains, the $m_0+1$ clock domains are: the clock domain 1, the clock domain 2, . . . , the clock domain $m_0$, and the DAC clock domain respectively, and the $m_0$ cross-clock domains are: the cross-clock domain 1, the cross-clock domain 2 . . . and the cross-clock domain $m_0$ respectively; and when data is transmitted in the sending link, the data is transmitted in an order of the clock domain 1. the cross-clock domain 1. the clock domain 2, the cross-clock domain 2 . . . , the clock domain $m_0$, the cross-clock domain $m_0$, and the DAC clock domain. As shown in FIG. 3, the receiving link includes $m_1+1$ clock domains and $m_1$ cross-clock domains, the $m_1+1$ clock domains are: the clock domain 1, the clock domain 2. the clock domain $m_1$, and the ADC clock domain respectively, and the $m_1$ cross-clock domains are: the cross-clock domain 1, the cross-clock domain 2 . . . and the cross-clock domain $m_1$ respectively; and when the data is transmitted in the receiving link, the data is transmitted in an order of the ADC clock domain, the cross-clock domain $m_1$, the clock domain $m_1$ . . . the cross-clock domain 2, the clock domain 2, the cross-clock domain 1, and the clock domain 1. As shown in FIG. 4, the feedback link includes $m_2+1$ clock domains and $m_2$ cross-clock domains, the $m_2+1$ clock domains are: the clock domain 1, the clock domain 2 . . . the clock domain m₂, and the ADC clock domain respectively, and the m₂ cross-clock domains are: the cross-clock domain 1, the cross-clock domain 2 . . . and the cross-clock domain m₂ respectively; and when the data is transmitted in the feedback link, the data is transmitted in an order of the ADC clock domain, the cross-clock domain m₂, the clock domain m₂, . . . , the cross-clock domain 2, the clock domain 2, the cross-clock domain 1, and the clock domain 1.

In some exemplary implementations, in view of the fact that the transmission link includes two or more clock domains and different clocks are adopted in the different clock domains, that is, clock frequencies or clock cycles are different in the different clock domains, in order to enable the generated pulse signal to adapt to the clocks of the different clock domains when being transmitted in the transmission link, a proportional relationship between ratios corresponding to all the clock domains in the transmission link is equal to a proportional relationship between the clock frequencies of all the clock domains: a ratio corresponding to a clock domain is a ratio of a cycle of the pulse signal corresponding to the transmission link to a clock cycle of the clock domain. In this way, the cycle of the pulse signal corresponding to the transmission link remains unchanged in the different clock domains of the same transmission link, and for the pulse signal corresponding to the transmission link, a high level signal of one clock cycle exists in each clock domain, as shown in FIG. 5. By adopting the pulse signal with the fixed cycle, analysis of diversity of decimation and interpolation of multi-bit data when being transmitted in the transmission link can be avoided, and delay ripple detection can be performed conveniently and quickly by taking use of form invariance of the pulse signal during a transmission process thereof.

For example, assuming that a certain transmission link includes two clock domains, namely a clock domain 1 and a clock domain 2, a clock frequency of the clock domain 1 is 983.04 MHZ, a clock frequency of the clock domain 2 is 737.28 MHZ, and a proportional relationship between the clock frequency of the clock domain 1 and the clock frequency of the clock domain 2 is 4:3, then a ratio of a cycle of a pulse signal corresponding to the transmission link to a clock cycle of the clock domain 1 and a ratio of the cycle of the pulse signal corresponding to the transmission link to a clock cycle of the clock domain 2 should also have a proportional relationship of 4:3.

In the implementations of the present disclosure, the form invariance of the pulse signal refers to that the cycle of the pulse signal is the same in the different clock domains. However, the ratios of the cycle of the pulse signal to the clock cycles of the clock domains are different, and for the pulse signal, a high level signal of merely one clock cycle exists in each clock domain.

In some exemplary implementations, the cross-clock domain in the transmission link is implemented by an FIFO memory, a pipelined logic circuit may be provided before the FIFO memory or after the FIFO memory, or pipelined logic circuits may be provided before and after the FIFO memory, and delay correction is performed through adjustment of the number of taps (pipelined stages) of the pipelined logic circuit(s). For example, the pipelined logic circuit merely needs to be provided in a cross-clock domain which needs to be subjected to delay correction. For example, if delay correction needs to be performed on each cross-clock domain of the transmission link, a pipelined logic circuit needs to be provided in each cross-clock domain; and if delay correction merely needs to be performed on a last cross-clock domain, a pipelined logic circuit merely needs to be provided in the last cross-clock domain.

In the implementations of the present disclosure, the alignment and transmission of the pulse signal and the data refers to that the pulse signal and the data are transmitted to a lower level circuit synchronously under the control of a data effective enable signal. There are two cases: synchronous transmission in a certain clock domain and synchronous transmission across clock domains. The pulse signal and the data need to meet the following two standards for the aligned transmission: 1. a transmission delay of the pulse signal is the same as that of the data; and 2. the pulse signal and effective data have a fixed corresponding relationship.

In a certain clock domain, without being processed such as being filtered together with the data, the pulse signal is merely subjected to register tapping with a configurable order, so as to ensure that a delay of the pulse signal when being output to a next stage is the same as a delay of the processed data when being output to the next stage in different working scenes. Moreover, although the data is processed differently, such as being subjected to different interpolation processes and different decimation processes, with a filter in the transmission link in different working scenes, a processing mode of the data in a certain working scene is fixed. Therefore, in order to ensure the fixed corresponding relationship between the pulse signal and the effective data, a high level width of the pulse signal is expanded by a configurable multiple according to the multiple relationships of the interpolation processes or the extraction processes of the data (for example, when the data is subjected to an N-fold decimation process, the high level width of the pulse signal is expanded to N times the original high level width; and when the data is subjected to an N-fold interpolation process, the high level width of the pulse signal is reduced to 1/N the original high level width), so that, after the pulse signal is subjected to register tapping under the control of the data effective enable signal, a high-level pulse signal of merely one clock cycle may be obtained when the pulse signal is sampled in a lower level circuit. When being transmitted across the clock domains, the pulse signal and the data signal are combined together, and writing and reading of the signals are controlled by data effective enable signals in a front-stage clock domain and a back-stage clock domain, so as to ensure that the pulse signal and the data signal have the same delay and the fixed effective corresponding relationship.

For example, when the data is subjected to an N-fold decimation process, expanding the pulse signal by a multiple refers to expanding a width of the high level signal of the pulse signal to N times the original width; and when the data is subjected to an N-fold interpolation process, expanding the pulse signal by a multiple refers to reducing the width of the high level signal of the pulse signal to 1/N the original width.

In some exemplary implementations, the pulse monitoring circuit 803 is configured to determine whether the delay ripple anomaly is present in the transmission link according to the monitored pulse signal in at least one of the following ways: determining that the delay ripple anomaly is present in the transmission link in the case where a first ratio is not equal to a second ratio, with the first ratio being a ratio of a cycle of the monitored pulse signal to a clock cycle of a last clock domain of the transmission link, and the second ratio being a ratio of a cycle of the pulse signal corresponding to the transmission link to the clock cycle of the last clock domain of the transmission link; or determining that the delay ripple anomaly is not present in the transmission link in the case where the first ratio is equal to the second ratio.

In some exemplary implementations, if the number of transmission links is one, the transmission link merely includes the sending link, or the receiving link, or the feedback link, and delay correction merely needs to be performed on the last cross-clock domain of the transmission link, the pulse monitor 803 is further configured to: control the transmission link 802 to correct a delay in the case where the presence of the delay ripple anomaly in the transmission link is determined according to the monitored pulse signal. In such case, the pipelined logic circuit merely needs to be provided in the last clock domain of the transmission link.

In some exemplary implementations, the pulse monitoring circuit 803 is further configured to: in the case where the presence of the delay ripple anomaly in the transmission link is determined according to the monitored pulse signal, generate a delay ripple alarm message corresponding to the transmission link, and send the delay ripple alarm message corresponding to the transmission link to an interrupt control circuit 804. The delay ripple detection circuit further includes: the interrupt control circuit 804 configured to perform an abnormal interruption process, and send the delay ripple alarm message corresponding to the transmission link to a software processing module 805: the software processing module 805 configured to control a sampling circuit 806 to sample the pulse signal in at least two clock domains of the transmission link according to the delay ripple alarm message corresponding to the transmission link, determine a position of the delay ripple anomaly according to the sampled pulse signal, and control the transmission link 802 to correct a delay at the position of the delay ripple anomaly; and the sampling circuit 806 configured to sample the pulse signal in at least one clock domain of the transmission link.

In some exemplary implementations, the delay ripple alarm message includes: information representing the presence of the delay ripple anomaly in the transmission link.

In some exemplary implementations, the delay ripple alarm message further includes at least one of: the number of occurrences of delay ripple anomalies, or a difference between the first ratio and the second ratio when a latest delay ripple anomaly is present; and the first ratio is the ratio of the cycle of the monitored pulse signal to the clock cycle of the last clock domain of the transmission link, and the second ratio is the ratio of the cycle of the pulse signal corresponding to the transmission link to the clock cycle of the last clock domain of the transmission link.

In the implementations of the present disclosure, in the case where the number of transmission links is two or more, each transmission link is corresponding to one delay ripple alarm message. After receiving the delay ripple alarm messages corresponding to two or more transmission links, the interrupt control circuit 804 combines delay ripple alarm messages corresponding to the two or more transmission links, performs an abnormal interrupt process, and sends a combined delay ripple alarm message to the software processing module 805.

In some exemplary implementations, the interrupt control circuit 804 may combine delay ripple alarm messages received within a preset period of time, perform an abnormal interruption process, and send a combined delay ripple alarm message to the software processing module 805.

In some exemplary implementations, the software processing module 805 is configured to achieve determining the position of the delay ripple anomaly according to the sampled pulse signal in a following way: in the case where a third ratio is not equal to a fourth ratio, determining that the position of the delay ripple anomaly is between a clock domain where a certain sampling point in the transmission link is located and a clock domain where a previous sampling point in the transmission link is located; and the third ratio is a ratio of a cycle of the pulse signal sampled at the certain sampling point to a clock cycle of the clock domain where the certain sampling point is located, and the fourth ratio is a ratio of the cycle of the pulse signal corresponding to the transmission link to the clock cycle of the clock domain where the certain sampling point is located.

In some exemplary implementations, the software processing module 805 may perform delay correction by adjusting the number of taps (pipelined stages) of a pipelined logic circuit provided in a cross-clock domain of the transmission link 802. For example, when the cycle of the pulse signal is reduced by one clock cycle, the number of taps (pipelined stages) of the pipelined logic circuit is increased by 1, so as to make the output pulse signal have the cycle the same as that before being input; and when the cycle of the pulse signal is increased by one clock cycle, the number of taps (pipelined stages) of the pipelined logic circuit is reduced by 1, so as to make the output pulse signal have the cycle the same as that before being input.

In some example implementations, the functions of the software processing module 805 may be implemented by a processor and a memory having stored therein a software program for performing the functions of the software processing module 805. When the program is executed by the processor, the functions of the software processing module 805 are performed.

With the delay ripple detection circuit provided in the implementations of the present disclosure, the pulse signal is generated with the pulse generation circuit, the alignment and transmission of the pulse signal corresponding to the transmission link and the data corresponding to the transmission link is performed through the transmission link, and the pulse signal after being transmitted is monitored with the pulse monitoring circuit, so as to determine whether the delay ripple anomaly is present in the transmission link. Based on the aligned transmission of the pulse signal and the data and the form invariance of the pulse signal in the transmission process thereof, by taking use of the characteristic that a delay ripple may affect the inter-pulse interval between the clock domains, real-time detection of the delay ripple of the link is achieved without off-line analysis, and moreover, no complex algorithm or calculation needs to be introduced in, and the detection of the delay ripple of the link can be realized easily and quickly.

It should be understood by those of ordinary skill in the art that the functional modules/units in all or some of the operations, systems, and devices disclosed in the above method may be implemented as software, firmware, hardware, or suitable combinations thereof. If implemented as hardware, the division between the functional modules/units stated above is not necessarily corresponding to the division of physical components; and for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other storage technology, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses exemplary implementations using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular implementation can be used alone or in combination with features, characteristics and/or elements described in connection with other implementations. Therefore, it should be understood by those of ordinary skill in the art that various changes in the forms and the details can be made without departing from the scope of the present disclosure of the appended claims.

What is claimed is:

1. A delay ripple detection method comprising:
    generating a pulse signal corresponding to a transmission link to be monitored;
    aligning and transmitting the pulse signal corresponding to the transmission link and data corresponding to the transmission link in the transmission link; and
    monitoring the pulse signal after being transmitted in the transmission link, and determining whether a delay ripple anomaly is present in the transmission link according to the monitored pulse signal.

2. The delay ripple detection method of claim 1, wherein in the case where the presence of the delay ripple anomaly in the transmission link is determined according to the monitored pulse signal, the method further comprises:
    generating a delay ripple alarm message corresponding to the transmission link, and sampling the pulse signal in at least one clock domain of the transmission link according to the delay ripple alarm message corresponding to the transmission link; and
    determining a position of the delay ripple anomaly according to the sampled pulse signal, and correcting a delay at the position of the delay ripple anomaly.

3. The delay ripple detection method of claim 2, wherein the delay ripple alarm message comprises: information representing the presence of the delay ripple anomaly in the transmission link.

4. The delay ripple detection method of claim 3, wherein the delay ripple alarm message further comprises at least one of: the number of occurrences of delay ripple anomalies, or a difference between a first ratio and a second ratio when a latest delay ripple anomaly is present;
    wherein the first ratio is a ratio of a cycle of the monitored pulse signal to a clock cycle of a last clock domain of the transmission link, and the second ratio is a ratio of a cycle of the pulse signal corresponding to the transmission link to the clock cycle of the last clock domain of the transmission link.

5. The delay ripple detection method of claim 3, wherein the transmission link comprises at least one of: a sending link, a receiving link, a feedback link, the sending link and the receiving link, or the sending link and the feedback link.

6. The delay ripple detection method of claim 3, wherein a proportional relationship between ratios corresponding to all clock domains in the transmission link is equal to a proportional relationship between clock frequencies of all the clock domains; wherein a ratio corresponding to each clock domain is a ratio of a cycle of the pulse signal corresponding to the transmission link to a clock cycle of the clock domain.

7. The delay ripple detection method of claim 3, wherein determining whether the delay ripple anomaly is present in the transmission link according to the monitored pulse signal comprises at least one of:
    determining that the delay ripple anomaly is present in the transmission link in the case where a first ratio is not equal to a second ratio; wherein the first ratio is a ratio of a cycle of the monitored pulse signal to a clock cycle of a last clock domain of the transmission link, and the second ratio is a ratio of a cycle of the pulse signal corresponding to the transmission link to the clock cycle of the last clock domain of the transmission link; or
    determining that the delay ripple anomaly is not present in the transmission link in the case where the first ratio is equal to the second ratio.

8. The delay ripple detection method of claim 2, wherein determining the position of the delay ripple anomaly according to the sampled pulse signal comprises:
    in the case where a third ratio is not equal to a fourth ratio, determining that the position of the delay ripple anomaly is between a clock domain where a certain sampling point in the transmission link is located and a clock domain where a previous sampling point in the transmission link is located;
    wherein the third ratio is a ratio of a cycle of the pulse signal sampled at the certain sampling point to a clock cycle of the clock domain where the certain sampling point is located, and the fourth ratio is a ratio of a cycle of the pulse signal corresponding to the transmission link to the clock cycle of the clock domain where the certain sampling point is located.

9. The delay ripple detection method of claim 2, wherein the transmission link comprises at least one of: a sending link, a receiving link, a feedback link, the sending link and the receiving link, or the sending link and the feedback link.

10. The delay ripple detection method of claim 2, wherein a proportional relationship between ratios corresponding to all clock domains in the transmission link is equal to a proportional relationship between clock frequencies of all the clock domains; wherein a ratio corresponding to each clock domain is a ratio of a cycle of the pulse signal corresponding to the transmission link to a clock cycle of the clock domain.

11. The delay ripple detection method of claim 2, wherein determining whether the delay ripple anomaly is present in the transmission link according to the monitored pulse signal comprises at least one of:
   determining that the delay ripple anomaly is present in the transmission link in the case where a first ratio is not equal to a second ratio; wherein the first ratio is a ratio of a cycle of the monitored pulse signal to a clock cycle of a last clock domain of the transmission link, and the second ratio is a ratio of a cycle of the pulse signal corresponding to the transmission link to the clock cycle of the last clock domain of the transmission link; or
   determining that the delay ripple anomaly is not present in the transmission link in the case where the first ratio is equal to the second ratio.

12. The delay ripple detection method of claim 1, wherein the transmission link comprises at least one of: a sending link, a receiving link, a feedback link, the sending link and the receiving link, or the sending link and the feedback link.

13. The delay ripple detection method of claim 1, wherein a proportional relationship between ratios corresponding to all clock domains in the transmission link is equal to a proportional relationship between clock frequencies of all the clock domains; wherein a ratio corresponding to each clock domain is a ratio of a cycle of the pulse signal corresponding to the transmission link to a clock cycle of the clock domain.

14. The delay ripple detection method of claim 1, wherein determining whether the delay ripple anomaly is present in the transmission link according to the monitored pulse signal comprises at least one of:
   determining that the delay ripple anomaly is present in the transmission link in the case where a first ratio is not equal to a second ratio; wherein the first ratio is a ratio of a cycle of the monitored pulse signal to a clock cycle of a last clock domain of the transmission link, and the second ratio is a ratio of a cycle of the pulse signal corresponding to the transmission link to the clock cycle of the last clock domain of the transmission link; or
   determining that the delay ripple anomaly is not present in the transmission link in the case where the first ratio is equal to the second ratio.

15. A delay ripple detection circuit, comprising:
   a pulse generation circuit configured to generate a pulse signal corresponding to a transmission link to be monitored;
   a transmission link configured to align and transmit the pulse signal corresponding to the transmission link and data corresponding to the transmission link in the transmission link; and
   a pulse monitoring circuit configured to monitor the pulse signal after being transmitted in the transmission link, and determine whether a delay ripple anomaly is present in the transmission link according to the monitored pulse signal.

16. The delay ripple detection circuit of claim 15, wherein the pulse monitoring circuit is further configured to: in the case where the presence of the delay ripple anomaly in the transmission link is determined according to the monitored pulse signal, generate a delay ripple alarm message corresponding to the transmission link, and send the delay ripple alarm message corresponding to the transmission link to an interrupt control circuit; and
   the delay ripple detection circuit further comprises:
   the interrupt control circuit configured to perform an abnormal interruption process, and send the delay ripple alarm message corresponding to the transmission link to a software processing module;
   the software processing module configured to control a sampling circuit to sample the pulse signal in at least two clock domains of the transmission link according to the delay ripple alarm message corresponding to the transmission link, determine a position of the delay ripple anomaly according to the sampled pulse signal, and control the transmission link to correct a delay at the position of the delay ripple anomaly; and
   the sampling circuit configured to sample the pulse signal in at least one clock domain of the transmission link.

17. The delay ripple detection circuit of claim 16, wherein the transmission link comprises at least one of: a sending link, a receiving link, a feedback link, the sending link and the receiving link, or the sending link and the feedback link.

18. The delay ripple detection circuit of claim 17, in the case where the transmission link comprises the sending link and the receiving link or the transmission link comprises the sending link and the feedback link, the transmission link further comprises: a selection circuit configured to connect the sending link to the receiving link or connect the sending link to the feedback link.

19. The delay ripple detection circuit of claim 15, wherein the transmission link comprises at least one of: a sending link, a receiving link, a feedback link, the sending link and the receiving link, or the sending link and the feedback link.

20. The delay ripple detection circuit of claim 19, in the case where the transmission link comprises the sending link and the receiving link or the transmission link comprises the sending link and the feedback link, the transmission link further comprises: a selection circuit configured to connect the sending link to the receiving link or connect the sending link to the feedback link.

* * * * *